(12) United States Patent
Kanamori

(10) Patent No.: US 8,775,455 B2
(45) Date of Patent: Jul. 8, 2014

(54) DOCUMENT SEARCH SYSTEM WHICH REFLECTS THE SITUATION OF USING DOCUMENTS IN THE SEARCH RESULTS

(75) Inventor: Masaoki Kanamori, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 12/346,153

(22) Filed: Dec. 30, 2008

(65) Prior Publication Data
US 2010/0169295 A1 Jul. 1, 2010

(51) Int. Cl.
*G06F 7/00* (2006.01)

(52) U.S. Cl.
USPC ............ 707/758; 707/705; 707/706; 707/716; 726/22

(58) Field of Classification Search
CPC ...................................................... G06F 17/00
USPC .............. 707/755, 705; 709/200, 206; 726/22
See application file for complete search history.

(56) References Cited

U.S. PATENT DOCUMENTS

| | | | |
|---|---|---|---|
| 7,831,676 B1 * | 11/2010 | Nagar | 709/206 |
| 2002/0116575 A1 | 8/2002 | Toyomura et al. | |
| 2005/0198166 A1 | 9/2005 | Kawaji | |
| 2006/0248155 A1 | 11/2006 | Bondarenko et al. | |

FOREIGN PATENT DOCUMENTS

| | | |
|---|---|---|
| JP | 2002-278901 A | 9/2002 |
| JP | 2003067306 A | 3/2003 |
| JP | 2004192335 A | 7/2004 |
| JP | 2005-166039 A | 6/2005 |
| JP | 200625253 A | 9/2006 |
| JP | 2006-309761 A | 11/2006 |
| JP | 2006-330899 A | 12/2006 |
| JP | 2006-330899 A2 | 10/2013 |

* cited by examiner

*Primary Examiner* — Tony Mahmoudi
*Assistant Examiner* — Tuan-Khanh Phan
(74) *Attorney, Agent, or Firm* — Scully, Scott, Murphy & Presser, P.C.; William H. Steinberg, Esq

(57) ABSTRACT

A document search system includes a plurality of computers in a network having a router, and an email software program on each of the computers. A database stores attachment files and email documents. A search program on at least one of the computers initiating storage of email documents and attachment files. A mail journal database stores email data extracted by the search program from the email. A message identification (ID) identifying the email document, and the ID being generated by the search program and associating an email document with corresponding email data, and the ID associating the email document with an attachment file when an attachment file is sent. A file loader replacing an attachment file with a file link and storing the attachment file in the database. The file link provides access to the attachment file in the database.

14 Claims, 2 Drawing Sheets

DOCUMENT SEARCH SYSTEM WHICH REFLECTS THE SITUATION OF USING DOCUMENTS IN THE SEARCH RESULTS

FIELD OF THE INVENTION

The present invention relates to a document search system and a method for searching documents, and more particularly, a search system for email documents and file attachments which provides search results from the email document and the file attachments.

BACKGROUND OF THE INVENTION

Document stored in a document database are typical managed for searching by correlating specified records or attribution information about the documents or data. The records or attribution information may include, for example, varies condition or purposes of the document, e.g., research paper, publication, area of technology. Further examples of records include time of creation, creator, and in the case of document sent in email, the records may include the party sending, the receiving party, the time and date of sending the size of the document. Searching data in an email system or database may be provided by the email program or a separate search program. Current document search systems for email documents use specified email data or email attribution information to provide search results. Expanding and updating attribution information provides more accurate search results by providing more detailed information for the search. However, updating the attribution information is time consuming for users and thus is seldom performed. Further, other attempts to manage email documents include assigning categories to documents. However, the categories assigned may not reflect the many aspects of the document, such as different subject areas of data, leading to a search for specified data not providing the best results as the category may not relate to the search terms.

There is therefore a need for a searching system and method of searching documents which provides more accurate search results.

SUMMARY OF THE INVENTION

In an aspect of the invention, a document search system includes a computer network including a plurality of computers, an email software program stored on computer readable medium on each of the computers and being executed by a processor in the computer, and a router communicating with the computer network for routing email from the email software program in the computer network. The system further includes a database for storing attachment files and email documents, a search program stored on computer readable medium on at least one of the computers and being executed by a processor in the computer. The search program initiates storage of email documents and attachment files. A mail journal database stores email data extracted by the search program from the email. A message identification (ID) identifies the email document. The ID is generated by the search program and associates an email document with corresponding email data. The ID associates the email document with an attachment file when an attachment file is sent. A file loader is part of the search program, and the file loader replaces an attachment file with a file link and stores the attachment file in the database. The file link provides access to the attachment file in the database.

In a related aspect, the system further includes a first database for email documents, a second database for file attachments, and the mail journal database being a third database. In another related aspect, the message IDs are stored in the first and second databases, and the third database stores email data. Additionally, the email data may include email header information. Further, email data or attribution information may include the time the email was sent and the time the email was received in the database. Additionally, an email document and/or attachment file may be designated as confidential.

In another aspect of the invention, a method of searching documents includes: sending emails using an email software program stored on computer readable medium on each of the computers and being executed by a processor in the computer, the emails being sent using a computer network including a plurality of computers; routing emails for delivery being sent over the computer network using the email software program; initiating storage of email documents and attachment files using a search program being stored on computer readable medium on at least one of the computers and being executed by a processor in the computer; storing attachment files in a database and email documents; storing email data extracted by the search program from the email to a mail journal database; generating a message identification (ID) for each email using the search program; identifying the email document using the message identification; associating an email document with corresponding email data using the ID, and associating the email document with an attachment file when an attachment file is sent using the ID; replacing an attachment file with a file link and storing the attachment file in the database using a file loader being part of the search program; and providing access to the attachment file in the database using the file link.

In a related aspect, the method includes storing the message IDs in first and second databases, and storing the email data in a third database. The method may farther include designating an email document and/or attachment file as confidential.

In another aspect of the invention, a computer program product comprises a computer readable medium having recorded thereon a computer program being executed by a processor for searching documents. The computer program performs the steps of: sending emails using an email software program stored on computer readable medium on each of the computers and being executed by a processor in the computer, the emails being sent using a computer network including a plurality of computers; routing emails for delivery being sent over the computer network using the email software program; initiating storage of email documents and attachment files using a search program being stored on computer readable medium on at least one of the computers and being executed by a processor in the computer; storing attachment files in a database and email documents; storing email data extracted by the search program from the email to a mail journal database; generating a message identification (ID) for each email using the search program; identifying the email document using the message identification; associating an email document with corresponding email data using the ID, and associating the email document with an attachment file when an attachment file is sent using the ID; replacing an attachment file with a file link and storing the attachment file in the database using a file loader being part of the search program; and providing access to the attachment file in the database using the file link.

In a related aspect, the computer program product further comprising the step of: storing the message IDs in a first and second databases, and storing the email data in a third database. The program may further comprise the step of designating an email document and/or attachment file as confidential.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
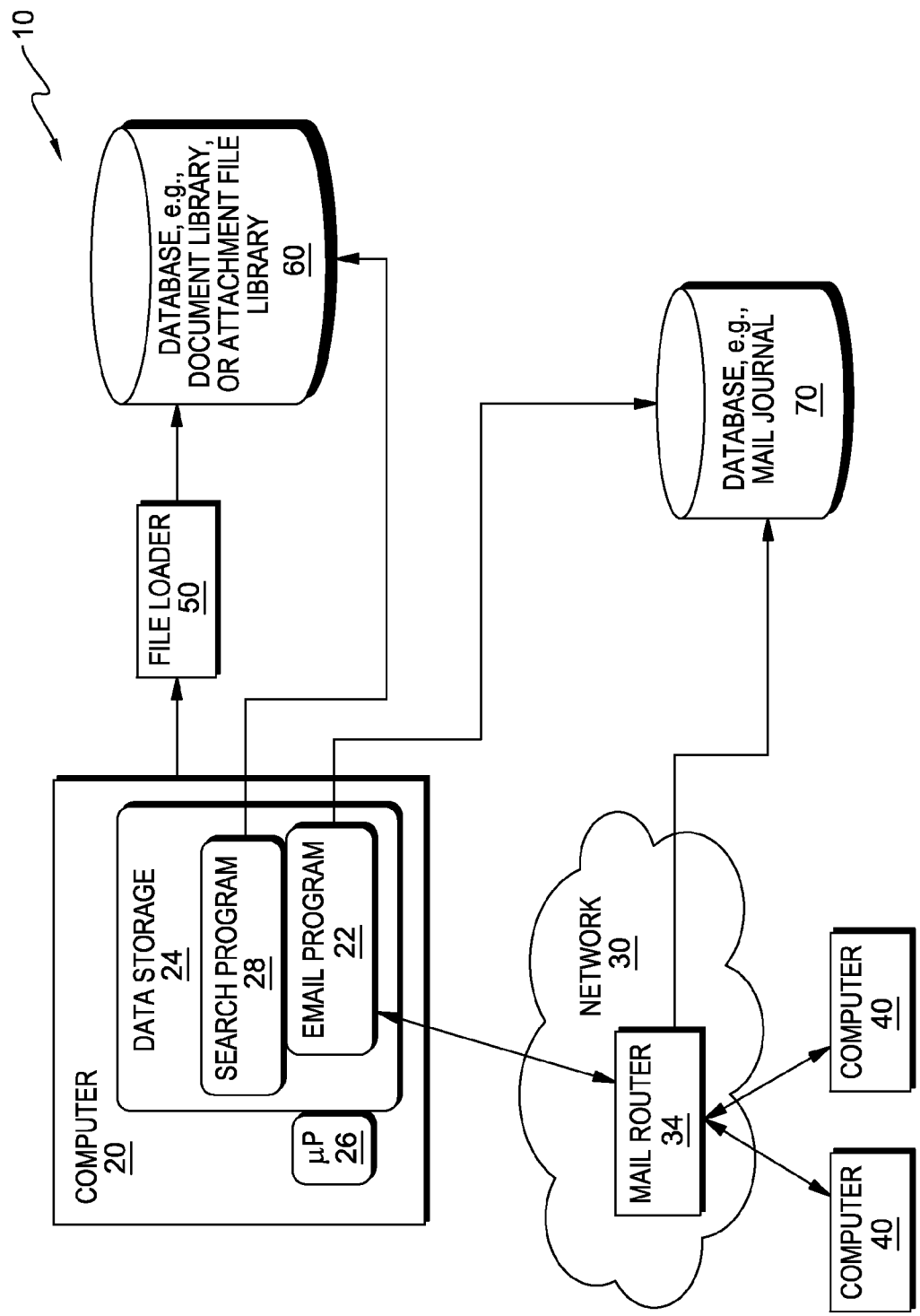
FIG. 1 is a block diagram depicting an illustrative document search system according to one embodiment of the invention.

Referring to FIG. 1, an illustrative embodiment according to the invention of a document search system 10 using documents and email data in the search results is shown. An email software program 22 is embodied on computer readable medium embodied as data storage 24 in a computer system 20. The program 22 is executed by a microprocessor 26. The computer 20 communicates with other computers 40 using a network 30 which may be wireless or wired, and includes a mail router 34. The system 10 further includes a search software program 28 embodied on the data storage 24 and executed by the microprocessor 26. A user may send an email document having header information such as a subject, a mail address, from address, date and time, and the content of the email, as well as one or more file attachments. When a user sends a file attachment with an email, a file loader 50 initiated by the search program sends the attachment file to a database 60 which may be embodied as an attachment file library and/or a document library. The file loader 50 is part of the email program 22 or application and may be running on the computer 20, or on a client computer 40, or alternatively, running on the mail router, or a mail server. The file loader generates a file link for retrieving the stored file. The file link is sent to the intended recipient of the email. In an alternative embodiment, the file loader may generate a copy of the attachment file for the database and thereby allow the original attachment file to be sent to its intended recipient. In order to associate the e-mail document with the attachment file, the file loader 50 generates an identification (ID) of the e-mail document and maintains the ID in the attachment file library 60 for associating the email document to the appropriate file attachment. The email document and the attachment file are grouped and defined as attribution information or email data. The e-mail documents transmitted from users are collected in a database embodied as a mail journal 70. The mail journal may be implemented by the email program 22 as a product function. Thereby, email documents in the mail journal 70 are associated with attachments in the file library 60 using the search program 28. In one example, users transmit information regarding a file attachment in an e-mail exchange after transmitting the file attachment in the document database by e-mail. In this example, it is possible to determine that the original e-mail is replied to or forwarded to another email user by using the identification of the e-mail. Therefore, when no attachment file is sent with an email, it is possible to associate the email document in the mail journal 70 with the associated attachment file using the document ID.

The document search system 10, searches all mail regardless of the originator, i.e., regardless of whether the mail is considered from one party (sender). The information on the searched mails does not appear on the search results, but is used for searching documents and files in the document library 60. The searched documents appear in the search results and are available for the user to read. Thus, the user can specify a document search, an attachment, and background information, for example, the document with the background information. The search for a document can include search terms related to the attribution information, including, email content, attachment file content and email header content. In one embodiment, a search result may include a list of files in the attachment file library 60.

Searching the content of the e-mail document is provided by using the ID of the e-mail resulting from the search to provide a list of associated file attachments in the search results. The search results include the email documents found in the search and the associated attachment files. A list of the e-mails may or may not be displayed with the search result.

In another aspect of the invention, contents of an email document may be secret or confidential. In this case, a user may designate part or the whole of the document or attachment(s) as being unavailable for searching.

Other data can be added to the attribution information, including, for example, when or what occasion, reason, or for what subject the email document sent. Further, data may include, where an email was sent from, to whom the email was sent, was the email sent with an important or urgent indicator as optioned by many email systems.

In one embodiment of the invention, searching email documents in the databases 60, 70 only includes searching contents described in the document and minimal attribution information such as the time of original entrance of the email document into the database. In another embodiment of the invention, several databases may be included in the system 10, for example, an email document database, a file attachment database, and a mail journal database. Email message IDs may be stored in either or both of the document and file databases.

Therefore, in accordance with the present invention, a user may search for a file in the database 60 and also search content of email documents for associated data. The e-mail associated with the document is treated as it were hidden or unavailable information, and thus a list of the e-mails resulting from the search is not provided, but a list of documents in the document database associated with the e-mails is displayed as the search result. Thus, the email document content is included in the attribution information and searchable, thereby, providing more accurate search results.

In operation, a method of searching documents according to an embodiment of the invention and using the system 10 shown in FIG. 1, includes sending emails using the email software program 22 using the computer network 30 to computer 40. The emails are routed for delivery using the router 34 after the attachment files are stored in the database 60 using a file loader 50. Storage of email documents and attachment files is initiated using the search program 28. The email documents are associated with corresponding email data using the ID, and the email document is associated using the ID with an attachment file when an attachment file is sent. Email data extracted by the search program from the email is stored in a mail journal database. A message identification (ID) is generated by the search program 28 for each email, and each email is identified using the message identification. For example, an email application may assign an ID to each mail message. An attachment file is replaced with a file link and the attachment file is stored in the database 60 using the file loader 50. Thereby, the file link provides access to the attachment file in the database 60.

In a further example of the present invention, a document search may be performed using keywords. The keywords are used in a full text search to find corresponding data in the database 60 in the document library and/or the attachment file library, and the email journal database 70. Additionally, a search may be performed wherein a keyword is used to search the mail journal database 70, and relevant message IDs found in the search are displayed with the search result. In a further example, the email data may also be displayed with the search result.

Figure 2:
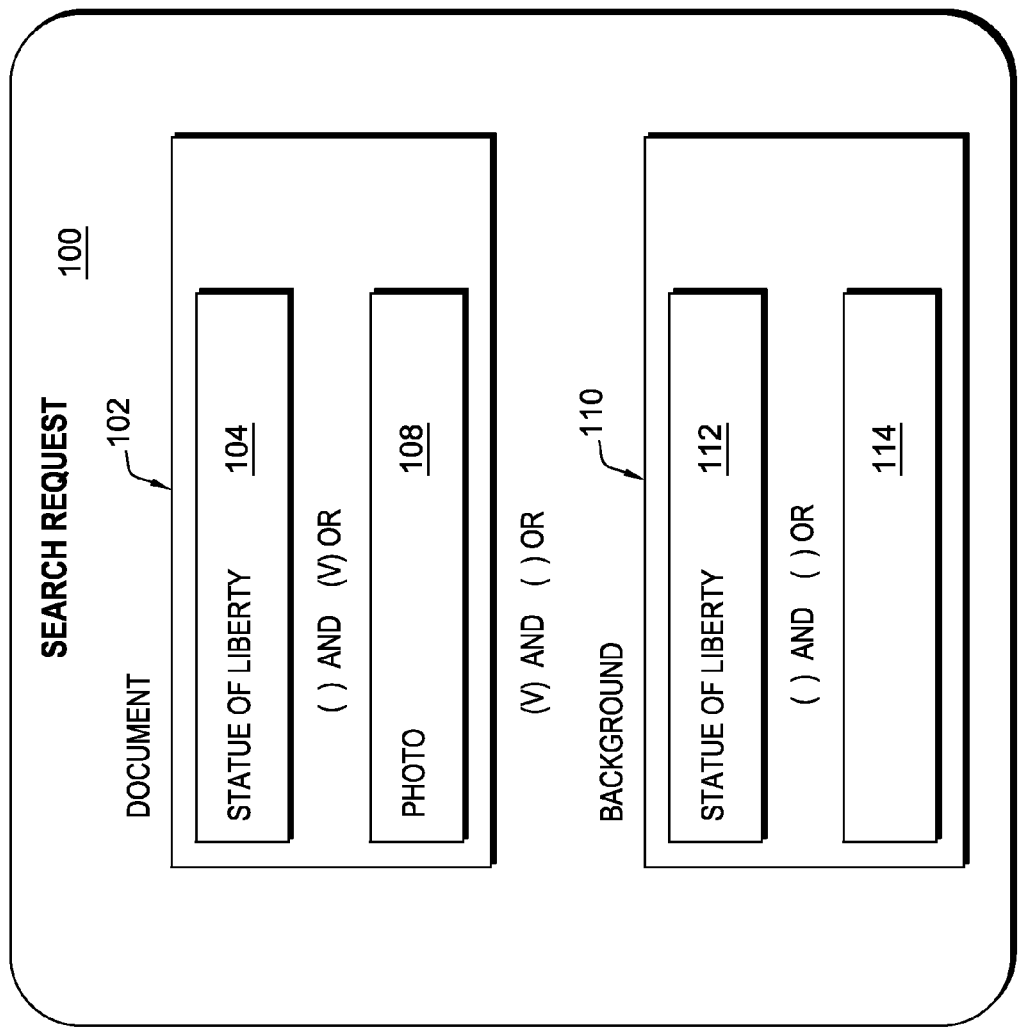
FIG. 2 is a block diagram depicting an exemplary search request.

Referring to FIG. 2, in an alternative example, a user may search for an item in the document library 60 using a search request 100. The search request 100 includes a document search field 102 for searching in documents. The document search field has two search fields 104, 108. The fields 104, 108 work in combination when a word or phrase is searched with another term. A background field of search 110 is for searching words or phrases in the background of the documents, which includes the emails stored in the database mail journal 70. The background field of search 110 includes sub fields of search 112, 114, similarly to fields 104, 108, for searching terms in combination. In the example shown in FIG. 2, the user searches by inputting a search term in the search fields 104, 108 for a document in the mail journal 70 which has an attachment, in this case, a "photo" stored in the library 60. Further, the user may search for another item in the document using the background field of search 112, for example, "Statute of Liberty". If a document is found in the library 60 meeting the search criteria, the information is presented to the user. The information includes, for example, that a person went to a specified city, in this example New York City, and included a photo of, for example, a landmark, in this case, the statute of liberty. The user cannot read the emails, but from the information presented the user can ascertain that the document is related to the search terms.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A document search system, comprising:
a computer network including a plurality of computers;
an email software program stored on computer readable medium on each of the computers and being executed by a processor in the computer;
a router communicating with the computer network for routing email from the email software program in the computer network;
a database for storing attachment flies and email documents;
a search program being stored on computer readable medium on at least one of the computers and being executed by a processor in the computer, the search program initiating storage of email documents and attachment files, the search program includes a search request which includes a document search field having two search fields for searching the email documents and the attachment files in the database, the search request further includes a background field of search for searching in a background of the stored email documents and the attachment files in the database using the search request;
a mail journal database for storing email data extracted by the search program from the email;
a message identification (ID) identifying the email document, the ID being generated by the search program and associating an email document with corresponding email data, and the ID associating the email document with an attachment file when an attachment file is sent, wherein message IDs are stored in the first and second databases, and the third database stores email data; and
a file loader being part of the search program, the file loader replacing an attachment file with a file link and storing the attachment file in the database, the file link providing access to the attachment file in the database;
the search request further includes a document search field configured to search the email data, the emails associated with the document search being viewable by a user, the background field of search configured to search the email data in the background of the stored email documents and the attachment files in the database and in the database mail journal, the emails associated with the background field of search being hidden from the user.

2. The system of claim 1, further comprising:
a first database for email documents, a second database for file attachments, and the mail journal database being a third database.

3. The system of claim 1, wherein email data includes email header information.

4. The system of claim 1, wherein email data further includes a time the email was sent and a time the email was received in the database.

5. The system of claim 1, wherein an email document and/or attachment file is designated as confidential.

6. A method of searching documents, comprising:
sending emails using an email software program stored on computer readable medium on each of the computers and being executed by a processor in the computer, the emails being sent using a computer network including a plurality of computers;
routing emails for delivery being sent over the computer network using the email software program;
initiating storage of email documents and attachment files using a search program being stored on computer readable medium on at least one of the computers and being executed by a processor in the computer;
initiating a search request using the search program, the search request including a document search field having two search fields for searching the email documents and the attachment files in the database, the search request further including a background field of search for searching in a background of the stored email documents and the attachment files in the database using the search request;
storing attachment files in a database and email documents;
storing email data extracted by the search program from the email to a mail journal database;
generating a message identification (ID) for each email using the search program; identifying the email document using the message identification;
associating an email document with corresponding email data using the ID, and associating the email document with an attachment file when an attachment file is sent using the ID;
storing the message IDs in a first and second databases, and storing the email data in a third database;

replacing an attachment file with a file link and storing the attachment file in the database using a file loader being part of the search program; and providing access to the attachment file in the database using the file link;

the search request further including a document search field configured to search the email data the emails associated with the document search being viewable by a user;

the background field of search configured to search the email data in the background of the stored email documents and the attachment files in the database and in the database mail journal, the emails associated with the background field of search being hidden from the user.

7. The method of claim 6, further comprising:

designating an email document and/or attachment file as confidential.

8. The method of claim 6, wherein email data includes email header information.

9. The system of claim 6, wherein email data further includes a time the email was sent and a time the email was received in the database.

10. A computer program product comprising a computer readable medium, said medium is not a propagating signal, having recorded thereon a computer program being executed by a processor for searching documents, the computer program performing the steps of:

sending emails using an email software program stored on computer readable medium on each of the computers and being executed by a processor in the computer, the emails being sent using a computer network including a plurality of computers;

routing emails for delivery being sent over the computer network using the email software program;

initiating storage of email documents and attachment files using a search program being stored on computer readable medium on at least one of the computers and being executed by a processor in the computer;

initiating a search request using the search program, the search request including a document search field having two search fields for searching the email documents and the attachment files in the database, the search request further including a background field of search for searching in a background of the stored email documents and the attachment files in the database using the search request;

storing attachment files in a database and email documents;

storing email data extracted by the search program from the email to a mail journal database;

generating a message identification (ID) for each email using the search program;

identifying the email document using the message identification;

associating an email document with corresponding email data using the ID, and associating the email document with an attachment file when an attachment file is sent using the ID;

storing the message IDs in a first and second databases, and storing the email data in a third database;

replacing an attachment file with a file link and storing the attachment file in the database using a file loader being part of the search program; and providing access to the attachment file in the database using the file link, wherein the search request further includes a document search field configured to search the email data, the emails associated with the document search being viewable by a user, and background field of search is configured to search the email data in the background of the stored email documents and the attachment files in the database and in the database mail journal, the emails associated with the background field of search being hidden from the user.

11. The computer program product of claim 10, further comprising the step of:

designating an email document and/or attachment file as confidential.

12. The method of claim 10, wherein email data includes email header information.

13. The system of claim 10, wherein email data further includes a time the email was sent and a time the email was received in the database.

14. The system of claim 1, wherein the document search field of the background field of search includes two search fields for searching the background of the stored email documents and the attachment files in the database using the search request.

* * * * *